(12) United States Patent
Kitao

(10) Patent No.: US 11,158,873 B2
(45) Date of Patent: Oct. 26, 2021

(54) CONTROL DEVICE FOR FUEL CELL SYSTEM

(71) Applicant: TOYOTA JIDOSHA KABUSHIKI KAISHA, Toyota (JP)

(72) Inventor: Noriyuki Kitao, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 171 days.

(21) Appl. No.: 16/030,096

(22) Filed: Jul. 9, 2018

(65) Prior Publication Data

US 2019/0051917 A1 Feb. 14, 2019

(30) Foreign Application Priority Data

Aug. 14, 2017 (JP) .............................. JP2017-156672

(51) Int. Cl.
  *H01M 8/04955* (2016.01)
  *H01M 8/04664* (2016.01)
  (Continued)

(52) U.S. Cl.
  CPC ..... *H01M 8/04955* (2013.01); *H01M 4/8652* (2013.01); *H01M 4/9016* (2013.01); *H01M 4/926* (2013.01); *H01M 8/0494* (2013.01); *H01M 8/04225* (2016.02); *H01M 8/04302* (2016.02); *H01M 8/04358* (2013.01); *H01M 8/04365* (2013.01); *H01M 8/04447* (2013.01); *H01M 8/04529* (2013.01); *H01M 8/04649* (2013.01); *H01M 8/04671* (2013.01); *H01M 8/04723* (2013.01); *H01M 8/04753* (2013.01); *H01M 2008/1095* (2013.01); *H01M 2250/20* (2013.01)

(58) Field of Classification Search
  CPC combination set(s) only.
  See application file for complete search history.

(56) References Cited

U.S. PATENT DOCUMENTS

| 2003/0137193 A1* | 7/2003 | Belschner | B60L 58/34 307/9.1 |
| 2012/0107711 A1* | 5/2012 | Tomita | H01M 8/04455 429/446 |
| 2019/0207232 A1* | 7/2019 | Khater | H01M 8/04597 |

FOREIGN PATENT DOCUMENTS

| JP | 2003-508877 A | 3/2003 |
| JP | 2003508877 | * 3/2003 |

(Continued)

*Primary Examiner* — Ula C Ruddock
*Assistant Examiner* — Sarika Gupta
(74) *Attorney, Agent, or Firm* — Hunton Andrews Kurth LLP

(57) ABSTRACT

A control device for a fuel cell system comprises a hydrogen deficiency judging part configured to judge if a hydrogen deficiency which is a state in which an amount of hydrogen supplied to the fuel cell is insufficient compared with an amount of hydrogen required for power generation has occurred, a hydrogen deficiency elimination judging part configured to judge if the hydrogen deficiency has been eliminated after the hydrogen deficiency judging part judges that the hydrogen deficiency has occurred and a breakage control part configured to make the circuit breaker temporarily break an electrical connection of the fuel cell and the electrical load part when the hydrogen deficiency elimination judging part judges that the hydrogen deficiency has been eliminated.

11 Claims, 10 Drawing Sheets

(51) Int. Cl.
    *H01M 8/0444*     (2016.01)
    *H01M 8/04492*     (2016.01)
    *H01M 8/04746*     (2016.01)
    *H01M 8/0432*     (2016.01)
    *H01M 4/92*     (2006.01)
    *H01M 4/90*     (2006.01)
    *H01M 8/04828*     (2016.01)
    *H01M 8/04225*     (2016.01)
    *H01M 8/04302*     (2016.01)
    *H01M 4/86*     (2006.01)
    *H01M 8/04701*     (2016.01)
    *H01M 8/04537*     (2016.01)
    *H01M 8/1018*     (2016.01)

(56) References Cited

FOREIGN PATENT DOCUMENTS

| | | | |
|---|---|---|---|
| JP | 2007-109428 A | | 4/2007 |
| JP | 2007109428 | * | 4/2007 |
| JP | 2008-147102 A | | 6/2008 |
| JP | 2008147102 | * | 6/2008 |
| JP | 2008-198439 A | | 8/2008 |
| JP | 2011134529 A | | 7/2011 |
| WO | 01/15247 A2 | | 3/2001 |

* cited by examiner

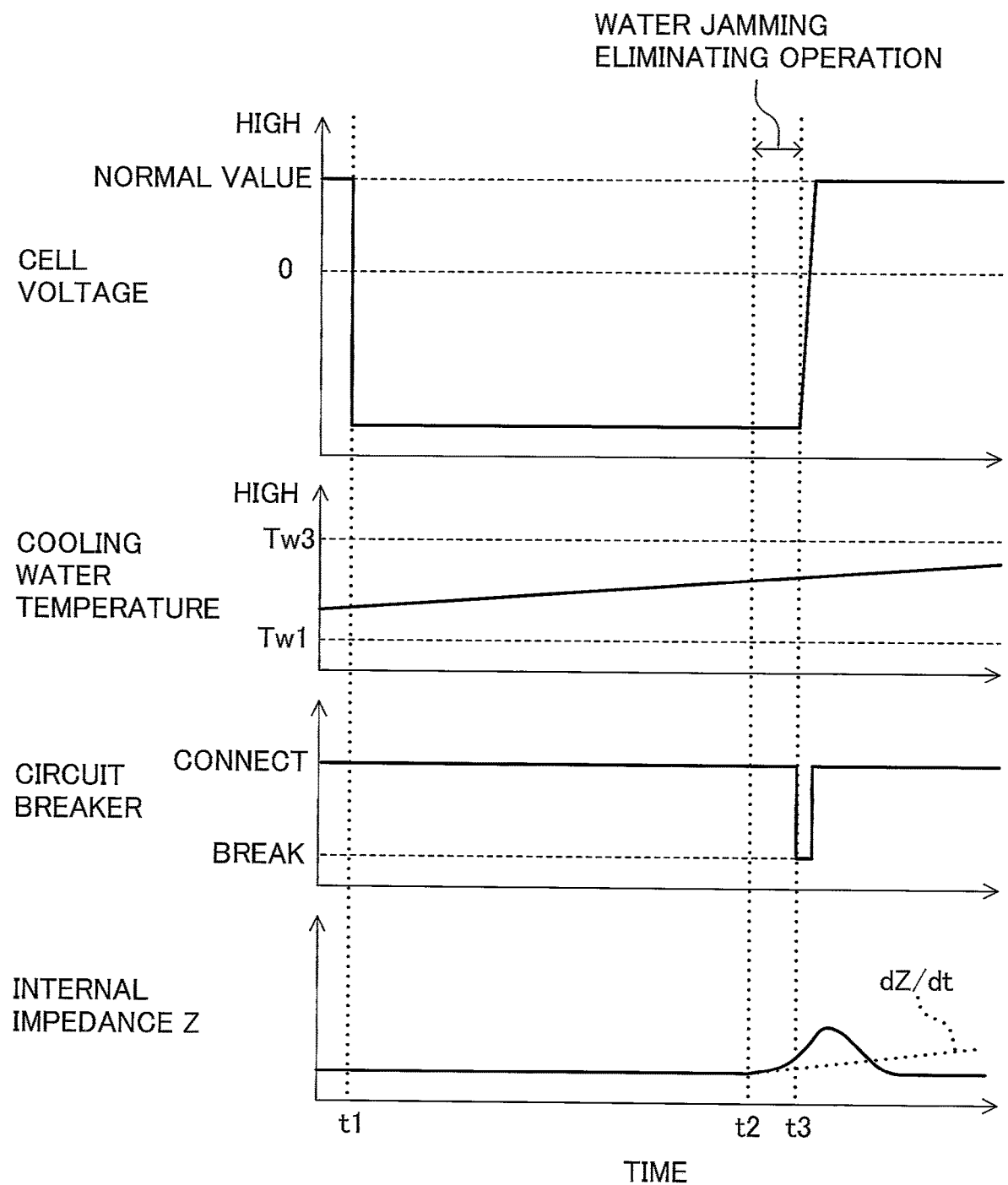

CONTROL DEVICE FOR FUEL CELL SYSTEM

CROSS-REFERENCE TO RELATED APPLICATION

This application claims priority based on Japanese Patent Application No. 2017-156672 filed with the Japan Patent Office on Aug. 14, 2017, the entire contents of which are incorporated into the present specification by reference.

TECHNICAL FIELD

The present disclosure relates to a control device for a fuel cell system.

BACKGROUND

Japanese Patent Publication No. 2003-508877A discloses a fuel cell with an anode electrode in which for example platinum or another catalyst for promoting a hydrogen oxidation reaction and also a catalyst for promoting the electrolysis of water (water electrolysis catalyst) are contained.

SUMMARY

By containing an anode electrode of a fuel cell a water electrolysis catalyst, when the amount of hydrogen which is supplied to the fuel cell becomes insufficient compared with the amount of hydrogen required for power generation, that is, when a hydrogen deficiency occurs, the carbon inside the anode electrode can be kept from being corroded by oxidation. However, even if containing a water electrolysis catalyst into an anode electrode of a fuel cell, if a hydrogen deficiency occurs, the voltage of the fuel cell will fall and a negative voltage will result. As a result, an oxide film will end up being formed on the surface of the platinum catalyst in the anode electrode. Even after the hydrogen deficiency is eliminated, there is the problem that time will be taken until the voltage of the fuel cell returns to a normal voltage value.

The present disclosure was made taking note of such a problem and has as its object to quickly return the voltage of the fuel cell to a normal voltage value after a hydrogen deficiency is eliminated when a hydrogen deficiency occurs and the voltage of the fuel cell falls.

To solve this problem, according to one aspect of the present disclosure, there is provided a control device for a fuel cell system for controlling the fuel cell system. The fuel cell system comprises a fuel cell with an anode electrode including a water electrolysis catalyst, an electrical load part electrically connected with the fuel cell and a circuit breaker physically breaking an electrical connection of the fuel cell and electrical load part. The control device for the fuel cell system comprises a hydrogen deficiency judging part configured to judge if a hydrogen deficiency which is a state in which an amount of hydrogen supplied to the fuel cell is insufficient compared with an amount of hydrogen required for power generation has occurred, a hydrogen deficiency elimination judging part configured to judge if the hydrogen deficiency has been eliminated after the hydrogen deficiency judging part judges that the hydrogen deficiency has occurred and a breakage control part configured to make the circuit breaker temporarily break an electrical connection of the fuel cell and the electrical load part when the hydrogen deficiency elimination judging part judges that the hydrogen deficiency has been eliminated.

According to this aspect of the present disclosure, if a hydrogen deficiency occurs and the voltage of a fuel cell falls, after the hydrogen deficiency has been eliminated, the voltage of the fuel cell can be quickly returned to a normal voltage value.

BRIEF DESCRIPTION OF DRAWINGS

FIG. 10 is a time chart for explaining the operation of voltage restoration control according to the fourth embodiment of the present disclosure.

DESCRIPTION OF EMBODIMENTS

Figure 1:
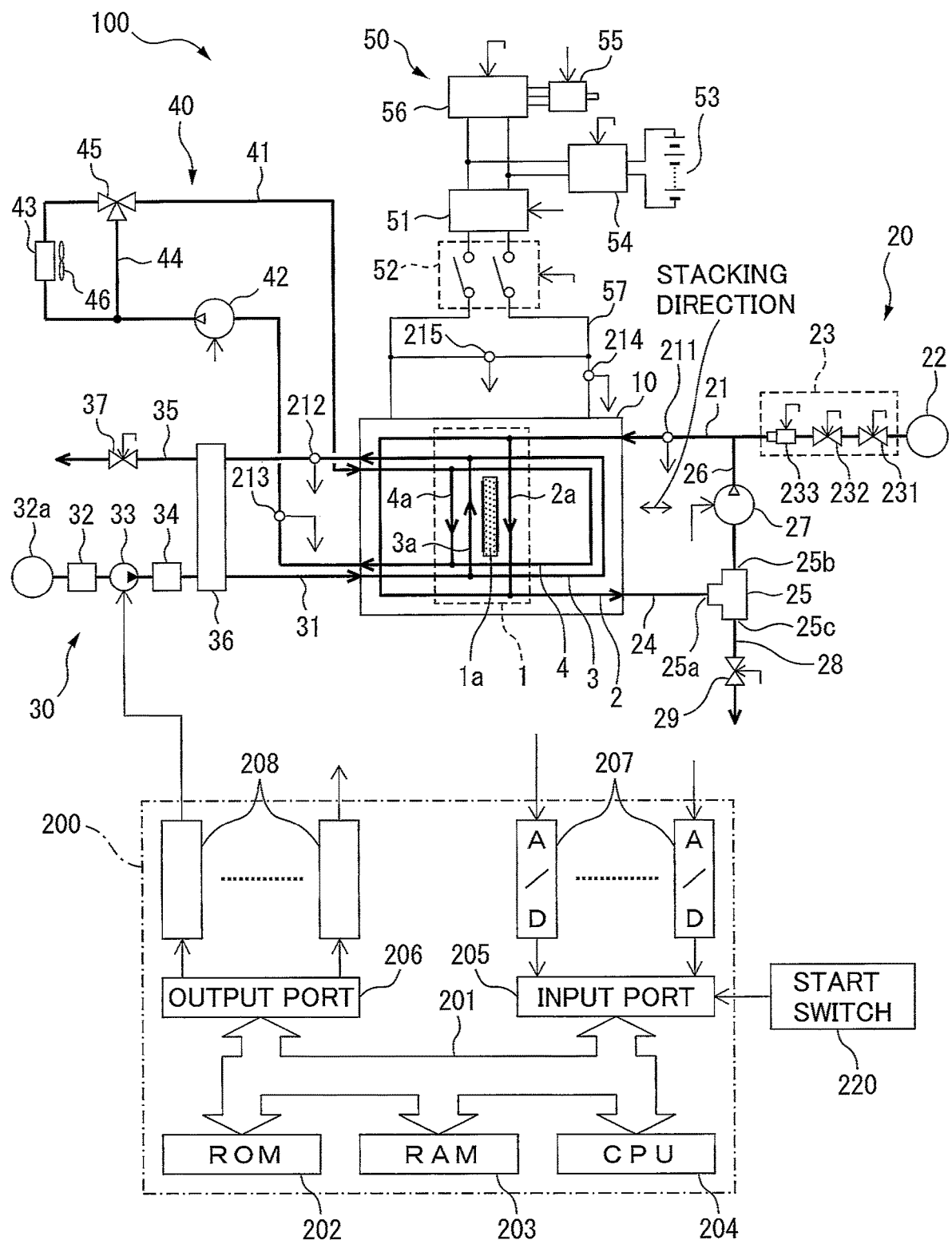
FIG. 1 is a schematic view of the configuration of a fuel cell system and an electronic control unit controlling the fuel cell system according to a first embodiment of the present disclosure.

Below, referring to the drawings, embodiments of the present disclosure will be explained in detail. Note that, in the following explanation, similar component elements will be assigned the same reference notations.

First Embodiment

FIG. 1 is a schematic view of the configuration of a fuel cell system 100 and an electronic control unit 200 controlling the fuel cell system 100 according to a first embodiment of the present disclosure.

The fuel cell system 100 comprises a fuel cell stack 10, a hydrogen supply/discharge apparatus 20 for supplying and discharging hydrogen as an anode gas (fuel gas) to and from the fuel cell stack 10, an air supply/discharge apparatus 30 for supplying and discharging air as a cathode gas (oxidizing agent gas) to and from the fuel cell stack 10, a cooling water circulation apparatus 40 for making the cooling water cooling the fuel cell stack 10 circulate, and an electrical load part 50 electrically connected to an output terminal of the fuel cell stack 10.

The fuel cell stack 10 is obtained by stacking a plurality of fuel cell unit cells (below, referred to as the "unit cells") 1 with each other along the stacking direction and electrically connecting the unit cells 1 in series. Each of the unit cells 1 is provided with an MEA (membrane electrode assembly) 1a.

An MEA 1a is comprised of a proton conductive ion exchange membrane formed by a solid polymer material (below, referred to as an "electrolyte membrane") on one surface of which an anode electrode is formed and on the other surface of which a cathode electrode is formed—all integrally joined. When the fuel cell stack 10 is generating power, the following electrochemical reactions occur at each anode electrode and cathode electrode:

Anode electrode: $2H_2 \rightarrow 4H^+ + 4e^-$ (1)

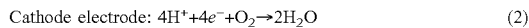

Cathode electrode: $4H^+ + 4e^- + O_2 \rightarrow 2H_2O$ (2)

An anode electrode and cathode electrode are respectively provided with a catalyst layer comprised of a porous carbon material on which a catalyst is supported. Each catalyst layer contains platinum as a catalyst for promoting an electrochemical reaction between hydrogen and oxygen (hydrogen oxidation reaction of formula (1) and oxygen reduction reaction of formula (2)). Note that the two outer surfaces of an MEAs 1a may also be further provided with an anode gas diffusion layer and a cathode gas diffusion layer.

Further, in the present embodiment, the catalyst layer of an anode electrode further contains a catalyst for promoting a water electrolysis reaction when the amount of supply of hydrogen to a unit cell 1 (below, referred to as a "water electrolysis catalyst") is insufficient. As the water electrolysis catalyst, for example, ruthenium oxide, iridium oxide, etc. may be mentioned. In the present embodiment, the reason for making the catalyst layer of an anode electrode contain a water electrolysis catalyst will be explained later.

In each unit cell 1, a hydrogen channel 2a for supplying hydrogen to the anode electrode and an air channel 3a for supplying air to the cathode electrode are formed. Further, between two adjoining unit cells, a cooling water channel 4a is formed for supplying cooling water.

The hydrogen channels 2a, air channels 3a, and cooling water channels 4a of the unit cells 1 are respectively connected in parallel inside the fuel cell stack 10. Due to this, a hydrogen passage 2, air passage 3, and cooling water passage 4 are formed inside the fuel cell stack 10.

In the present embodiment, an inlet and outlet of the hydrogen passage 2 are respectively provided at one end side of the fuel cell stack 10 in the stacking direction (right side in figure), while the inlets and outlets of the air passage 3 and cooling water passage 4 are respectively provided at the other end side of the fuel cell stack 10 in the stacking direction (left side in figure), but the disclosure is not limited to this. Further, in the present embodiment, the hydrogen passage 2 and air passage 3 are respectively supplied with hydrogen and air so that the directions of flow of hydrogen and air become opposite inside a unit cell 1, but they may also be supplied with hydrogen and air so that the directions become the same. Further, in the present embodiment, the direction of flow of the cooling water inside a unit cell 1 is made the same direction as the direction of flow of the hydrogen, but it may also be made an opposite direction.

The hydrogen supply/discharge apparatus 20 is provided with a hydrogen supply pipe 21, high pressure hydrogen tank 22 as a hydrogen source, hydrogen supply control part 23, anode off-gas pipe 24, gas-liquid separator 25, hydrogen return pipe 26, hydrogen circulation pump 27, purge pipe 28, and purge control valve 29.

The hydrogen supply pipe 21 is a pipe through which the hydrogen supplied to the hydrogen passage 2 flows. One end is connected to the high pressure hydrogen tank 22, while the other end is connected to the inlet of the hydrogen passage 2.

The high pressure hydrogen tank 22 stores hydrogen for supply to the hydrogen passage 2 through the hydrogen supply pipe 21.

The hydrogen supply control part 23 is provided with a main stop valve 231, regulator 232, and injector 233.

The main stop valve 231 is a solenoid valve opened and closed by the electronic control unit 200 and is provided at the hydrogen supply pipe 21. If the main stop valve 231 is opened, hydrogen flows out from the high pressure hydrogen tank 22 to the hydrogen supply pipe 21. If the main stop valve 231 is closed, the outflow of hydrogen from the high pressure hydrogen tank 22 is stopped.

The regulator 232 is provided at the hydrogen supply pipe 21 downstream from the main stop valve 231. The regulator 232 is a pressure control valve able to be adjusted in opening degree continuously or in stages. The opening degree is controlled by the electronic control unit 200. By controlling the opening degree of the regulator 232, the pressure of the hydrogen at the downstream side from the regulator 232, that is, the pressure of the hydrogen injected from the injector 233, is controlled.

The injector 233 is provided at the hydrogen supply pipe 21 downstream from the regulator 232. The injector 233 is, for example, a needle valve and is controlled to open and close by the electronic control unit 200. By controlling the opening time of the injector 233, the flow rate of the hydrogen injected from the injector 233 is controlled.

In this way, the supply of hydrogen from the high pressure hydrogen tank 22 to the hydrogen passage 2 is controlled by the hydrogen supply control part 23. That is, due to the hydrogen supply control part 23, hydrogen controlled to the desired pressure and flow rate is supplied to the hydrogen passage 2.

At the hydrogen supply pipe 21 downstream of the injector 233, an anode pressure sensor 211 is provided. The anode pressure sensor 211 detects the pressure of the hydrogen in the hydrogen supply pipe 21 downstream from the injector 233 as a value representing the pressure of the hydrogen inside the hydrogen passage 2 (below, referred to as the "anode pressure").

The anode off-gas pipe 24 is a pipe in which the anode off-gas which had flowed out from the hydrogen passage 2 flows. One end is connected to the outlet of the hydrogen passage 2, while the other end is connected to the gas inflow port 25a of the gas-liquid separator 25. The anode off-gas is gas containing the excess hydrogen which was not used in the electrochemical reactions in the unit cells 1 and the nitrogen or other inert gas and moisture (liquid water and steam) which had flowed from the air channel 3a through the MEA 1a and passed through the hydrogen channel 2a.

The gas-liquid separator 25 is provided with a gas inflow port 25a, gas outflow port 25b, and liquid water outflow port 25c. The gas-liquid separator 25 separates the water from the anode off-gas which had flowed in from the gas inflow port 25a to its inside. Further, the gas-liquid separator 25 discharges the separated water from the liquid water outflow port 25c to the purge pipe 28 and discharges the anode off-gas containing the hydrogen from which water was separated from the gas outflow port 25b to the hydrogen return pipe 26.

The hydrogen return pipe 26 is a pipe with one end connected to the gas outflow port 25b of the gas-liquid separator 25 and with the other end connected to the hydrogen supply pipe 21 downstream of the hydrogen supply control part 23. Anode off-gas discharged from the gas outflow port 25b of the gas-liquid separator 25 flows through it.

The hydrogen circulation pump 27 is provided at the hydrogen return pipe 26. The hydrogen circulation pump 27 is a pump for returning the hydrogen contained in the anode off-gas, that is, the excess hydrogen which had not been used for the electrochemical reactions inside the unit cells 1, to the hydrogen supply pipe 21 for recirculation. The hydrogen circulation pump 27 pressurizes the anode off-gas discharged from the gas outflow port 25b of the gas-liquid separator 25 and pumps it to the hydrogen supply pipe 21.

The purge pipe 28 is a pipe with one end connected to a liquid water outflow port 25c of the gas-liquid separator 25 and with the other end open to the atmosphere.

The purge control valve 29 is a solenoid valve opened and closed by the electronic control unit 200 and is provided at the purge pipe 28. The purge control valve 29 is normally closed and is periodically opened over short times. If the purge control valve 29 is opened, the water separated inside the gas-liquid separator 25 is discharged through the purge pipe 28 to the outside of the fuel cell system 100.

In this way, the fuel cell system 100 according to the present embodiment is a hydrogen circulation type fuel cell system returning the anode off-gas flowing out from the hydrogen passage 2 to the hydrogen supply pipe 21 for recirculation, but may also be a noncirculating hydrogen type fuel cell system in which anode off-gas which had flowed out from the hydrogen passage 2 is not returned to the hydrogen supply pipe 21.

The air supply/discharge apparatus 30 is provided with an air supply pipe 31, air cleaner 32, compressor 33, intercooler 34, cathode off-gas pipe 35, humidifier 36, and cathode pressure control valve 37.

The air supply pipe 31 is a pipe through which air supplied to the air passage 3 flows. One end is connected to the air cleaner 32, while the other end is connected to the inlet of the air passage 3.

The air cleaner 32 removes the foreign matter in the air sucked into the air supply pipe 31. The air cleaner 32 is arranged in the atmosphere forming the oxygen source 32a. That is, the oxygen source 32a is communicated with the air supply pipe 31 through the air cleaner.

The compressor 33 is, for example, a centrifugal type or axial flow type turbo compressor and is provided at the air supply pipe 31. The compressor 33 compresses and discharges the air sucked into the air supply pipe 31 through the air cleaner 32.

The intercooler 34 is provided at the air supply pipe 31 downstream from the compressor 33 and cools the air discharged from the compressor 33 by for example the wind stream, cooling water, etc.

The cathode off-gas pipe 35 is a pipe through which the cathode off-gas flowing out from the outlet of the air passage 3 flows. One end is connected to the outlet of the air passage 3, while the other end is open to the atmosphere. The cathode off-gas is gas containing excess oxygen which was not used for the electrochemical reactions in the unit cells 1, nitrogen or other inert gas, and moisture produced due to the electrochemical reactions (liquid water or steam).

The humidifier 36 is connected to the air supply pipe 31 and cathode off-gas pipe 35, recovers the moisture in the cathode off-gas flowing through the cathode off-gas pipe 35, and uses that recovered moisture to humidify the air flowing through the air supply pipe 31.

The cathode pressure control valve 37 is provided at the cathode off-gas pipe 35 downstream from the humidifier 36.

The cathode pressure control valve 37 is a solenoid valve able to be adjusted continuously or in stages in opening degree. Its opening degree is controlled by the electronic control unit 200. By controlling the opening degree of the cathode pressure control valve 37, the cathode pressure of the pressure inside the air passage 3 is controlled.

At the cathode off-gas pipe 35 upstream from the humidifier 36, a cathode pressure sensor 212 is provided. The cathode pressure sensor 212 detects the pressure inside the cathode off-gas pipe 35 upstream from the cathode pressure control valve 37 as a value representing the pressure inside the air passage 3 (cathode pressure).

The cooling water circulation apparatus 40 is provided with a cooling water circulation pipe 41, cooling water pump 42, radiator 43, radiator bypass pipe 44, and radiator bypass control valve 45.

The cooling water circulation pipe 41 is a pipe through which cooling water for cooling the fuel cell stack 10 is made to circulate. One end is connected to the inlet of the cooling water passage 4, while the other end is connected to the outlet of the cooling water passage 4. Below, the outlet side of the cooling water passage 4 is defined as "upstream of the cooling water circulation pipe 41", while the inlet side of the cooling water passage 4 is defined as "downstream of the cooling water circulation pipe 41" in the explanation.

The cooling water pump 42 is provided at the upstream side of the cooling water circulation pipe 41 and causes the cooling water to circulate.

At the cooling water circulation pipe 41 upstream from the cooling water pump 42, that is, the cooling water circulation pipe 41 near the outlet of the cooling water passage 4, a water temperature sensor 213 is provided. The water temperature sensor 213 detects the temperature of the cooling water flowing out from the cooling water passage 4 to the cooling water circulation pipe 41 as a value representing the temperature of the fuel cell stack 10. The cooling water pump 42 is controlled based on a control signal from the electronic control unit 200 so that the temperature of the cooling water detected by this water temperature sensor 213 becomes a predetermined target temperature (for example 60° C.).

The radiator 43 is provided at the cooling water circulation pipe 41 downstream from the cooling water pump 42. The cooling water flowing out from the outlet of the cooling water passage 4 is, for example, cooled by the wind stream or air sucked in by a radiator fan 46.

The radiator bypass pipe 44 is a pipe provided so as to enable the cooling water to be made to circulate without going through the radiator 43. One end is connected to the cooling water circulation pipe 41 between the cooling water pump 42 and the radiator 43, while the other end is connected to the radiator bypass control valve 45.

The radiator bypass control valve 45 is, for example, an electronic control type three-way valve and is provided at the cooling water circulation pipe 41 downstream from the radiator 43. The radiator bypass control valve 45 switches the circulation path of the cooling water according to the temperature of the cooling water. Specifically, when the temperature of the cooling water is higher than a predetermined reference temperature, the circulation path of the cooling water is switched so that the cooling water flowing out from the cooling water passage 4 to the cooling water circulation pipe 41 passes through the radiator 43 to again flow into the cooling water passage 4. Conversely, when the temperature of the cooling water is the reference temperature or less, the circulation path of the cooling water is switched so that the cooling water flowing out from the cooling water passage 4 to the cooling water circulation pipe 41 is made to flow through the radiator bypass pipe 44 to directly flow into the cooling water passage 4 without passing through the radiator 43.

The electrical load part 50 is provided with a first converter 51, circuit breaker 52, battery 53, second converter 54, motor-generator 55, and inverter 56.

At the connection line 57 of the electrical load part 50 and the output terminal of the fuel cell stack 10, a current sensor 214 for detecting the current taken out from the fuel cell stack 10 (below, referred to as the "stack current") and a voltage sensor 215 for detecting the terminal voltage of the output terminal of the fuel cell stack 10 (below, referred to as the "stack voltage") are provided. The stack current detected by this current sensor 214 corresponds to the load of the fuel cell stack 10.

The first converter 51 is a bidirectional DC/DC converter provided with an electrical circuit able to make the terminal voltage of the primary side terminal rise and fall. The primary side terminal is connected through the circuit breaker 52 to the output terminal of the fuel cell stack 10, while the secondary side terminal is connected to the DC side terminal of the inverter 56. The first converter 51 makes the stack voltage becoming the primary side terminal voltage rise and fall and controls the stack voltage to a target stack voltage set in accordance with the operating state of the fuel cell system 100 based on a control signal from the electronic control unit 200.

The circuit breaker 52 is opened and closed by the electronic control unit 200 and electrically and physically connects or breaks the connection of the fuel cell stack 10 and electrical load part 50.

The battery 53 is, for example, a nickel-cadmium storage battery or nickel-hydrogen storage battery, lithium ion battery, or other rechargeable secondary battery. The battery 53 is charged by the excess power of the fuel cell stack 10 and the power generated by the motor-generator 55. The power charged at the battery 53 is, according to need, used for driving the motor-generator 55, the compressor 33, or other controlled parts provided in the fuel cell system 100.

The second converter 54 is, for example, a bidirectional DC/DC converter provided with an electrical circuit able to make the terminal voltage of the secondary side terminal rise and fall. The primary side terminal is connected to the output terminal of the battery 53, while the secondary side terminal is connected to the DC side terminal of the inverter 56. The second converter 54 makes the input voltage of the inverter 56 becoming the secondary side terminal voltage rise and fall and controls the input voltage to a target input voltage set in accordance with the operating state of the fuel cell system 100 based on a control signal from the electronic control unit 200.

The motor-generator 55 is, for example, a three-phase permanent magnet type synchronous motor and is provided with a function as a motor generating power of the vehicle in which the fuel cell system 100 is mounted and a function as a generator generating power when the vehicle is decelerating. The motor-generator 55 is connected to the AC side terminal of the inverter 56 and is driven by the power generated by the fuel cell stack 10 and the power of the battery 53.

The inverter 56 is provided with an electrical circuit enabling it to convert the DC current input from the DC side terminal to an AC current and output it from the AC side terminal based on a control signal from the electronic control unit 200, while conversely enabling it to convert the AC current input from the AC side terminal to a DC current and output it from the DC side terminal based on a control signal from the electronic control unit 200. The DC side terminal of the inverter 56 is connected to the secondary side terminals of the first converter 51 and second converter 54, while the AC side terminal of the inverter 56 is connected to the input/output terminal of the motor-generator 55. When making the motor-generator 55 function as a motor, the inverter 56 converts the combined DC current of the fuel cell current of the fuel cell stack 10 and the battery current of the battery 53 to an AC current (in the present embodiment, three-phase AC current) which it then supplies to the motor-generator 55. On the other hand, when making the motor-generator 55 function as a generator, the inverter 56 converts the AC current from the motor-generator 55 to a DC current which it then supplies to the battery 53 etc.

The electronic control unit 200 is comprised of a digital computer provided with components connected with each other by a bidirectional bus 201 such as a ROM (read only memory) 202, RAM (random access memory) 203, CPU (microprocessor) 204, input port 205, and output port 206.

At the input port 205, output signals of the above-mentioned anode pressure sensor 211 and cathode pressure sensor 212, water temperature sensor 213, current sensor 214, voltage sensor 215, etc. are input through the corresponding AD converters 207. Further, at the input port 205, an output signal from the starter switch 220 for judging the startup and shutdown of the fuel cell system 100 is input.

At the output port 206, hydrogen supply control parts 23 (main stop valve 231, regulator 232, and injector 233) and control parts of the purge control valve 29, compressor 33, cathode pressure control valve 37, cooling water pump 42, radiator bypass control valve 45, first converter 51, circuit breaker 52, second converter 54, motor-generator 55, inverter 56, etc. are electrically connected through the corresponding drive circuits 208.

In this way, at the input port 205, output signals of the various sensors required for control of the fuel cell system 100 are input. The electronic control unit 200 outputs control signals for control of the different control parts from the output port 206 based on the output signals of the various sensors input to the input port 205.

Here, when mounting the fuel cell system 100 in a vehicle, sometimes the fuel cell system 100 is started up in a low temperature environment such as one where the outside air temperature becomes lower than 0° C. During operation of the fuel cell system 100, water generated at the cathode electrode side is produced by the oxygen reduction reaction of the above-mentioned formula (2), so sometimes part of this generated water passes from the cathode electrode side to the anode electrode side during operation of the fuel cell system 100 and remains in the anode electrode side hydrogen channel 2a even after the fuel cell system 100 is shut down.

Further, in the case of the hydrogen circulation type fuel cell system 100 such as in the present embodiment, while the gas-liquid separator 25 separates the moisture in the anode off-gas, sometimes complete separation of the moisture is not possible. For this reason, sometimes the hydrogen supplied to the hydrogen passage 2 and in turn the hydrogen channels 2a contains moisture. The moisture contained in the hydrogen sometimes remains in the hydrogen channels 2a. Further, aside from this as well, it may be that for some sort of reason, water enters into the hydrogen channels 2a and the water entering even after the fuel cell system 100 is shut down remains in the hydrogen channels 2a.

For this reason, in a low temperature environment, water remaining in the hydrogen channels 2a (below, referred to as the "residual water") is liable to freeze while the fuel cell system 100 is shut down. At the time of startup of the fuel cell system 100, if such freezing of the residual water occurs in, for example, the comb tooth parts (parts for distributing hydrogen to the anode electrodes of the unit cells 1 from the hydrogen manifold (hydrogen passage 2) formed when stacking the unit cells 1) and the rest of the hydrogen channels 2a, supply of hydrogen to a unit cell 1 where freezing has occurred is obstructed.

If in this way the fuel cell system 100 is operated in the state where the supply of hydrogen to at least part of the unit cells 1 is obstructed, a unit cell 1 to which the supply of hydrogen is obstructed becomes a hydrogen deficient state in which the amount of hydrogen required for generating power becomes insufficient, that is, a state in which the amount of hydrogen supplied becomes insufficient compared with the amount of hydrogen required for power generation set corresponding to the load of the fuel cell stack 10.

In the anode electrode of a unit cell 1 which has become hydrogen deficient, it becomes no longer possible to generate hydrogen ions (protons) by the hydrogen oxidation reaction of the above-mentioned formula (1). For this reason, at the anode electrode of a unit cell 1 which has become hydrogen deficient, utilizing the carbon contained in the anode electrode, a carbon oxidation reaction shown in the following formula (3) becomes dominant, hydrogen ions are generated, and the following electrochemical reactions occur at the electrodes.

$$\text{Anode electrode: } C+2H_2O \rightarrow CO_2+4H^++4e^- \quad (3)$$

$$\text{Cathode electrode: } 4H^++4e^-+O_2 \rightarrow 2H_2O \quad (2)$$

If, in this way, a carbon oxidation reaction occurs in an anode electrode, the carbon in the anode electrode will be corroded by oxidation, so the performance of a unit cell 1 which has become hydrogen deficient will be lowered.

Therefore, in the present embodiment, to suppress a carbon oxidation reaction at an anode electrode of a unit cell 1 which has become hydrogen deficient, the anode electrode is made to contain a water electrolysis catalyst. If an anode electrode contains a water electrolysis catalyst, when the cell becomes hydrogen deficient, the water in the electrolyte membrane is utilized so that instead of a carbon oxidation reaction, the water electrolysis reaction shown by the following formula (4) becomes dominant, hydrogen ions are produced, the following electrochemical reactions occur at the electrodes.

$$\text{Anode electrode: } 2H_2O \rightarrow O_2+4H^++4e^- \quad (4)$$

$$\text{Cathode electrode: } 4H^++4e^-+O_2 \rightarrow 2H_2O \quad (2)$$

For this reason, by making the anode electrode contain a water electrolysis catalyst, even if the cell becomes hydrogen deficient, the carbon can be kept from being corroded by oxidation.

In this regard, the potential of an anode electrode (standard electrode potential) when a hydrogen oxidation reaction shown in formula (1) occurs at the anode electrode is generally 0V or becomes lower than the potential of the cathode electrode (generally 0.6V to 0.8V or so) when an oxygen reduction reaction shown in formula (2) occurs at the cathode electrode.

However, when a carbon oxidation reaction shown in formula (3) or when water electrolysis reaction shown in formula (4) occurs at an anode electrode, the potential of the anode electrode tends to become higher than the potential of the above-mentioned cathode electrode. That is, the cell voltage of a unit cell 1 which has become hydrogen deficient (potential of cathode electrode-potential of anode electrode) tends to become a negative voltage regardless of the presence of any water electrolysis catalyst.

If the platinum catalyst in the anode electrode is exposed a potential of a certain potential (generally 0.6V or so) or more, it oxidizes and an oxide film is formed at the surface. The coverage rate increases the higher the potential.

Therefore, if the fuel cell system 100 is operated in the state where there is a unit cell 1 which has become hydrogen deficient, the cell voltage of that unit cell 1 will become a negative voltage. Regardless of the presence of any water electrolysis catalyst, an oxide film is formed on the surface of the platinum catalyst in the anode electrode. Note that the potential of an anode electrode when a water electrolysis reaction occurs becomes lower than the potential of an anode electrode when a carbon oxidation reaction occurs, so by making an anode electrode contain a water electrolysis catalyst, the coverage rate of the oxide film formed on the surface of the platinum catalyst itself can be lowered.

The oxide film formed the surface of the platinum catalyst in an anode electrode is removed by reduction by hydrogen if the hydrogen deficiency is eliminated and hydrogen is supplied to the hydrogen channel 2a, that is, if placed in a hydrogen atmosphere (reducing atmosphere).

However, once the platinum catalyst is covered by an oxide film, the platinum catalyst loses its activity, so even after the hydrogen deficiency has been eliminated, a hydrogen oxidation reaction becomes difficult to occur at the anode electrode and sufficient hydrogen ions can no longer be generated with just a hydrogen oxidation reaction. For this reason, even after the hydrogen deficiency is eliminated, to make up for the insufficient hydrogen ions, if the anode electrode does not contain a water electrolysis catalyst, a carbon oxidation reaction occurs. If a water electrolysis catalyst is contained, basically a water electrolysis reaction occurs.

Therefore, even after a hydrogen deficiency is eliminated, a state where the anode electrode is high in potential continues and an oxide film is easily formed, so time is taken for reduction of the oxide film by hydrogen. Further, a hydrogen oxidation reaction also occurs and the hydrogen required for reduction of the oxide film is consumed by the hydrogen oxidation reaction, so time is taken for reduction of the oxide film by hydrogen due to this as well.

Even if making an anode electrode contain a water electrolysis catalyst in this way, if the fuel cell system 100 is operated in a state where there is a unit cell 1 which has become hydrogen deficient, the cell voltage of that unit cell 1 becomes a negative voltage and an oxide film is formed on the surface of the platinum catalyst in the anode electrode. Further, if the cell voltage becomes a negative voltage and the platinum catalyst is covered by an oxide film once, even after the hydrogen deficiency is eliminated, the state where the cell voltage is a negative voltage continues for a while and time is taken until the cell voltage returns from the negative voltage to a normal voltage value.

Therefore, when the cell voltage becomes a negative voltage, it may also be considered to limit the output to temporarily make the target generated power zero and stop the power generation by the fuel cell stack 10. By limiting the output in this way, power is no longer generated in the unit cell 1 and a hydrogen oxidation reaction and water electrolysis reaction no longer occur at an anode electrode, so it may be possible to quickly reduce the oxide film by hydrogen in a hydrogen atmosphere.

However, even if limiting the output in such a way, if the electrical connection of the fuel cell stack 10 and electrical load part 50 is not physically broken by the circuit breaker 52, actually a slight dark current will sometimes flow through the connection line 57 from the fuel cell stack 10 to the electrical load part 50. That is, even if limiting the output, a state arises where a hydrogen oxidation reaction ends up occurring inside a unit cell 1 and the hydrogen required for reduction of the oxide film ends up being consumed by the hydrogen oxidation reaction. As a result, the reduction of the oxide film by hydrogen does not quickly proceed. Time is liable to be taken until the cell voltage returns from a negative voltage to a normal voltage value.

Therefore, in the present embodiment, it was decided to judge if a hydrogen deficiency has occurred, to judge if that hydrogen deficiency has been eliminated, and, when judging that the hydrogen deficiency has been eliminated, to physically temporarily break the electrical connection of the fuel cell stack 10 and electrical load part 50 by the circuit breaker 52.

By physically breaking the electrical connection of the fuel cell stack 10 and electrical load part 50 by the circuit breaker 52 in this way, power is no longer generated inside the unit cell 1 and dark current no longer flows through the connection line 57, so it is possible to quickly reduce the oxide film by hydrogen in a hydrogen atmosphere. For this reason, it is possible to shorten the time until the cell voltage returns from a negative voltage to a normal voltage value. Below, the voltage restoration control according to the present embodiment will be explained.

Figure 2:
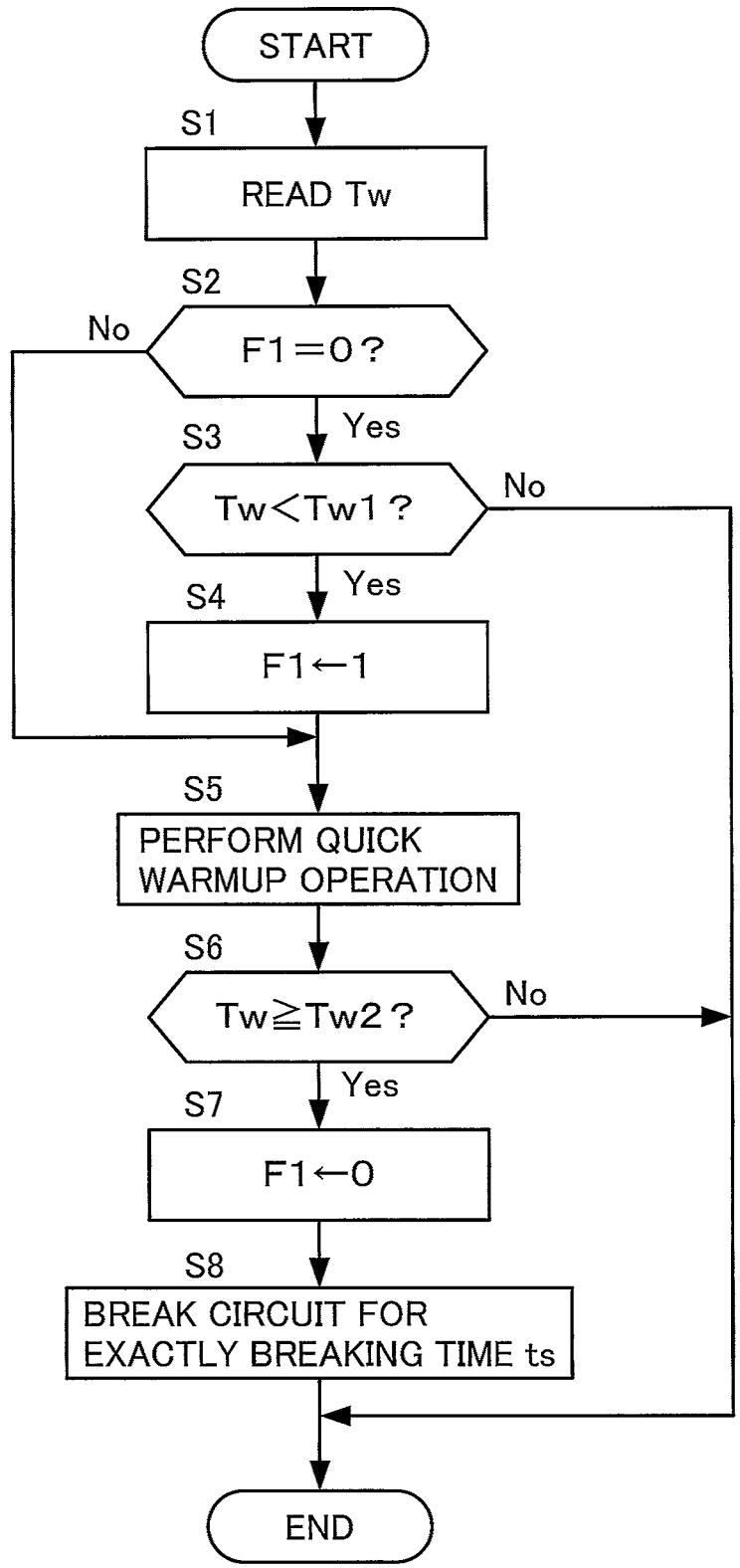
FIG. 2 is a flow chart for explaining voltage restoration control according to the first embodiment of the present disclosure.

FIG. 2 is a flow chart for explaining the voltage restoration control according to the present embodiment. The electronic control unit 200 repeatedly performs the present routine during operation of the fuel cell system 100 by a predetermined processing period Δt (ms).

At step S1, the electronic control unit 200 reads a cooling water temperature Tw detected by the water temperature sensor 213.

At step S2, the electronic control unit 200 judges if a flag F1 has been set to "0". The flag F1 is a flag which is set to "1" when a hydrogen deficiency is judged to have occurred in the later explained step S3 and which is returned to "0" when the hydrogen deficiency is eliminated in the later explained step S6. The initial value is set to "0".

At step S3, the electronic control unit 200 judges if there is a unit cell 1 which has become hydrogen deficient. In the present embodiment, the electronic control unit 200 judges that there is a unit cell 1 which has become hydrogen deficient and proceeds to the processing of step S4 if the cooling water temperature Tw is less than a predetermined freezing judging water temperature Tw1 (for example, 0° C.). This is because if the cooling water temperature Tw is less than the freezing judging water temperature Tw1, it can be judged that freezing of water causes the supply of hydrogen to at least part of the unit cells 1 to be obstructed. On the other hand, the electronic control unit 200 judges that there is no unit cell 1 which has become hydrogen deficient due to freezing of the residual water and ends the current processing if the cooling water temperature Tw is the freezing judging water temperature Tw1 or more.

At step S4, the electronic control unit 200 sets the flag F1 at "1".

At step S5, the electronic control unit 200 performs a quickly warmup operation for promoting warmup of the fuel cell stack 10. In the present embodiment, the electronic control unit 200 controls a cathode compressor 33 so that the flow rate of air supplied to the air passage 3 becomes smaller by exactly a predetermined amount than the target air flow rate set according to the load of the fuel cell stack 10. Due to this, the IV characteristic of the fuel cell stack 10 deteriorates and the heat loss increases by the amount of deterioration of the IV characteristic, so warmup of the fuel cell stack 10 can be promoted.

At step S6, the electronic control unit 200 judges if the hydrogen deficiency has been eliminated. In the present embodiment, the electronic control unit 200 judges that the hydrogen deficiency has been eliminated if the cooling water temperature Tw is a predetermined freezing eliminating water temperature Tw2 (for example 10° C.) higher than the freezing judging water temperature Tw1 or is more. This is because if the cooling water temperature Tw is the freezing eliminating water temperature Tw2 or more, it can be judged that the freezing of the residual water is eliminated and that hydrogen is being normally supplied to a unit cell 1. The electronic control unit 200 proceeds to the processing of step S7 if the cooling water temperature Tw is the freezing eliminating water temperature Tw2 or more. On the other hand, the electronic control unit 200 ends the current processing if the cooling water temperature Tw is less than the freezing eliminating water temperature Tw2.

At step S7, the electronic control unit 200 returns the flag F1 to "0".

At step S8, the electronic control unit 200 opens the circuit breaker 52 for exactly a predetermined breaking time ts and physically temporarily breaks the electrical connection between the fuel cell stack 10 and the electrical load part 50 by the circuit breaker 52.

In this way, by using the circuit breaker 52 to physically break the electrical connection between the fuel cell stack 10 and the electrical load part 50 after the hydrogen deficiency is eliminated, it is possible to make the hydrogen oxidation reaction at the anode electrode completely stop while placing the anode electrode in a hydrogen atmosphere. For this reason, it is possible to quickly reduce by hydrogen the oxide film formed on the surface of the platinum catalyst while physically breaking the electrical connection between the fuel cell stack 10 and the electrical load part 50.

According to results of experiments by the inventors, 100 seconds or so have been required when trying to restore voltage of a unit cell 1 in which the output had been limited without physically breaking the electrical connection and a negative voltage had resulted. As opposed to this, it is confirmed that if performing the voltage restoration control according to the present embodiment, it is possible to return the cell voltage of the unit cell 1 to a normal voltage value (about 0.8V) during the breaking time ts.

Note that the lower limit value of the breaking time ts is generally 1 msec or so. In the present embodiment, the breaking time ts is made 1 sec. On the other hand, the upper limit value of the breaking time ts is not particularly set, but while the connection is broken, power can no longer be supplied by the fuel cell stack 10, so the time is preferably in the range of time in which the battery 53 can supply power, for example, within 30 minutes, preferably within 1 minute, more preferably within 3 seconds.

Figure 3:
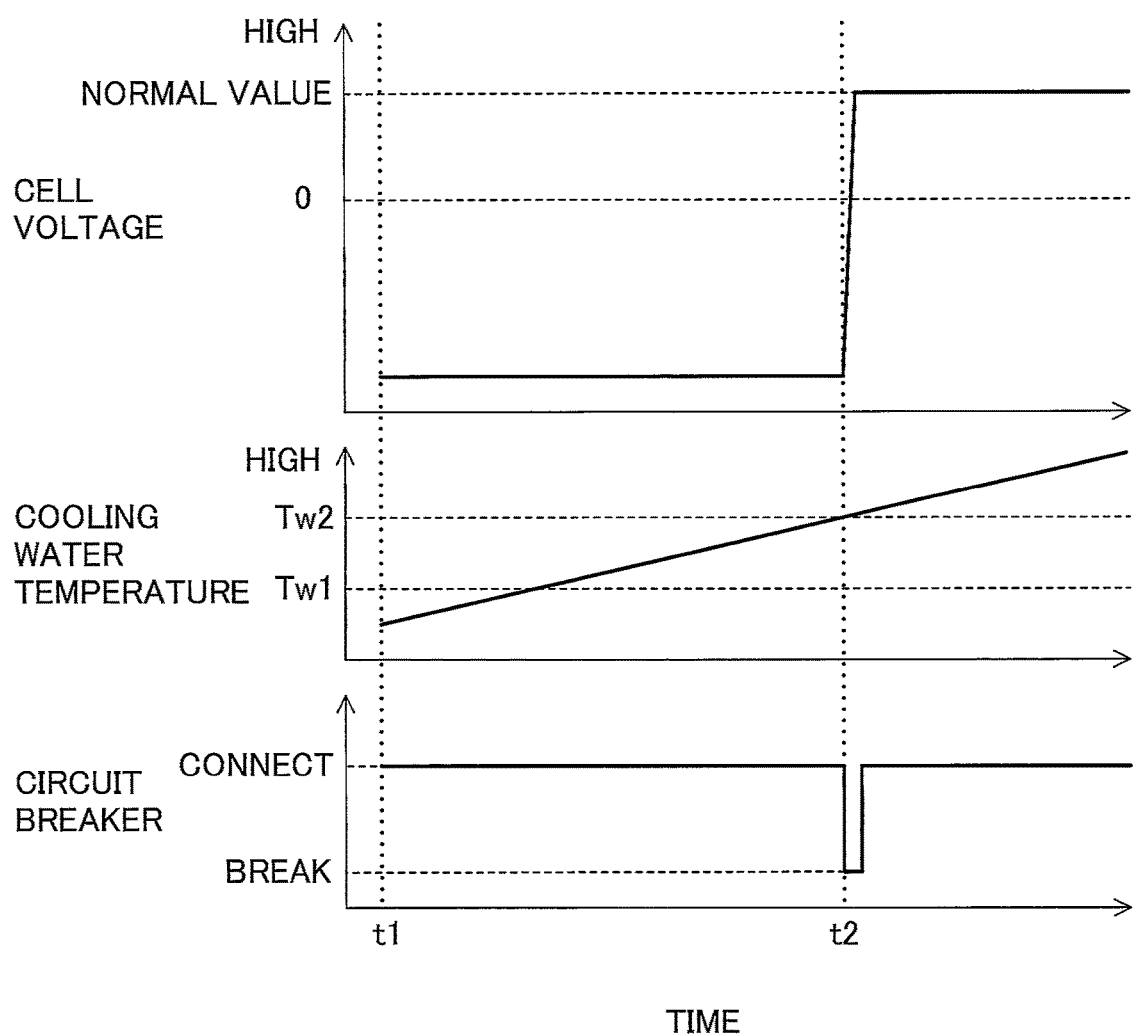
FIG. 3 is a time chart for explaining the operation of voltage restoration control according to the first embodiment of the present disclosure.

FIG. 3 is a time chart for explaining the operation of voltage restoration control according to the present embodiment.

At the time t1, the fuel cell system 100 is started up and the fuel cell system 100 starts operating. At this time, in the example shown in FIG. 3, the cooling water temperature Tw becomes less than the freezing judging water temperature Tw1 and part of the unit cells 1 become hydrogen deficient. As a result, during operation of the fuel cell system 100 at the time t1 on, the cell voltage becomes a negative voltage and an oxide film is formed on the surface of the platinum catalyst in the anode electrode of a unit cell 1 which becomes hydrogen deficient.

If, at the time t2, the cooling water temperature Tw becomes the freezing eliminating water temperature Tw2 or more, it is judged that the hydrogen deficiency has been eliminated, the circuit breaker 52 is opened for exactly a predetermined breaking time ts, and the electrical connection of the fuel cell stack 10 and electrical load part 50 is physically broken. Due to this, the oxide film which was formed on the surface of the platinum catalyst while the cell voltage was a negative voltage can be quickly reduced by hydrogen, so it is possible to quickly restore the cell voltage to a normal voltage value.

According to the present embodiment explained above, there is provided an electronic control unit 200 (control device) for controlling a fuel cell system 100. The fuel cell system 100 comprises a fuel cell (unit cell 1 or fuel cell stack 10) with an anode electrode containing a water electrolysis catalyst, an electrical load part 50 electrically connected to the fuel cell and a circuit breaker 52 physically breaking the electrical connection between the fuel cell and electrical load part 50. The electronic control unit 200 is configured to provide with a hydrogen deficiency judging part judging if a hydrogen deficiency which is a state in which an amount of hydrogen supplied to the fuel cell is insufficient compared with an amount of hydrogen required for power generation has occurred, a hydrogen deficiency elimination judging part judging if the hydrogen deficiency has been eliminated after the hydrogen deficiency judging part judges that the hydrogen deficiency has occurred, and a breakage control part making the circuit breaker 52 temporarily break an electrical connection of the fuel cell stack 10 and the electrical load part 50 when the hydrogen deficiency elimination judging part judges that the hydrogen deficiency has been eliminated.

In this way, by using the circuit breaker 52 to physically break the electrical connection between a fuel cell and the electrical load part 50 after the hydrogen deficiency is eliminated, it is possible to make the hydrogen oxidation reaction at the anode electrode of the fuel cell completely stop while placing the anode electrode in a hydrogen atmosphere. For this reason, it is possible to quickly reduce by hydrogen the oxide film formed on the surface of the platinum catalyst while physically breaking the electrical connection between the fuel cell and the electrical load part 50. Therefore, it is possible to quickly return the voltage of the fuel cell to a normal voltage value after eliminating the hydrogen deficiency.

Further, according to the present embodiment, the hydrogen deficiency judging part is configured to judge that a hydrogen deficiency has occurred when the cooling water temperature Tw representing the temperature of the fuel cell (representative temperature) is less than a predetermined freezing judging temperature Tw1 where water is liable to freeze inside the fuel cell. Further, the hydrogen deficiency elimination judging part is configured so as to judge that the hydrogen deficiency has been eliminated when the cooling water temperature Tw (representative temperature) has become a predetermined freezing elimination judging temperature Tw2 higher than the freezing judging temperature Tw1 or has become more.

Due to this, it is possible to precisely judge the occurrence and elimination of a hydrogen deficiency due to freezing of residual water.

Second Embodiment

Next, a second embodiment of the present disclosure will be explained. The present embodiment differs from the first embodiment on the point of judging whether the hydrogen deficiency has been eliminated based on the elapsed time te from when the hydrogen deficiency was judged to have occurred. Below, this point of difference will be focused on in the explanation.

Figure 4:
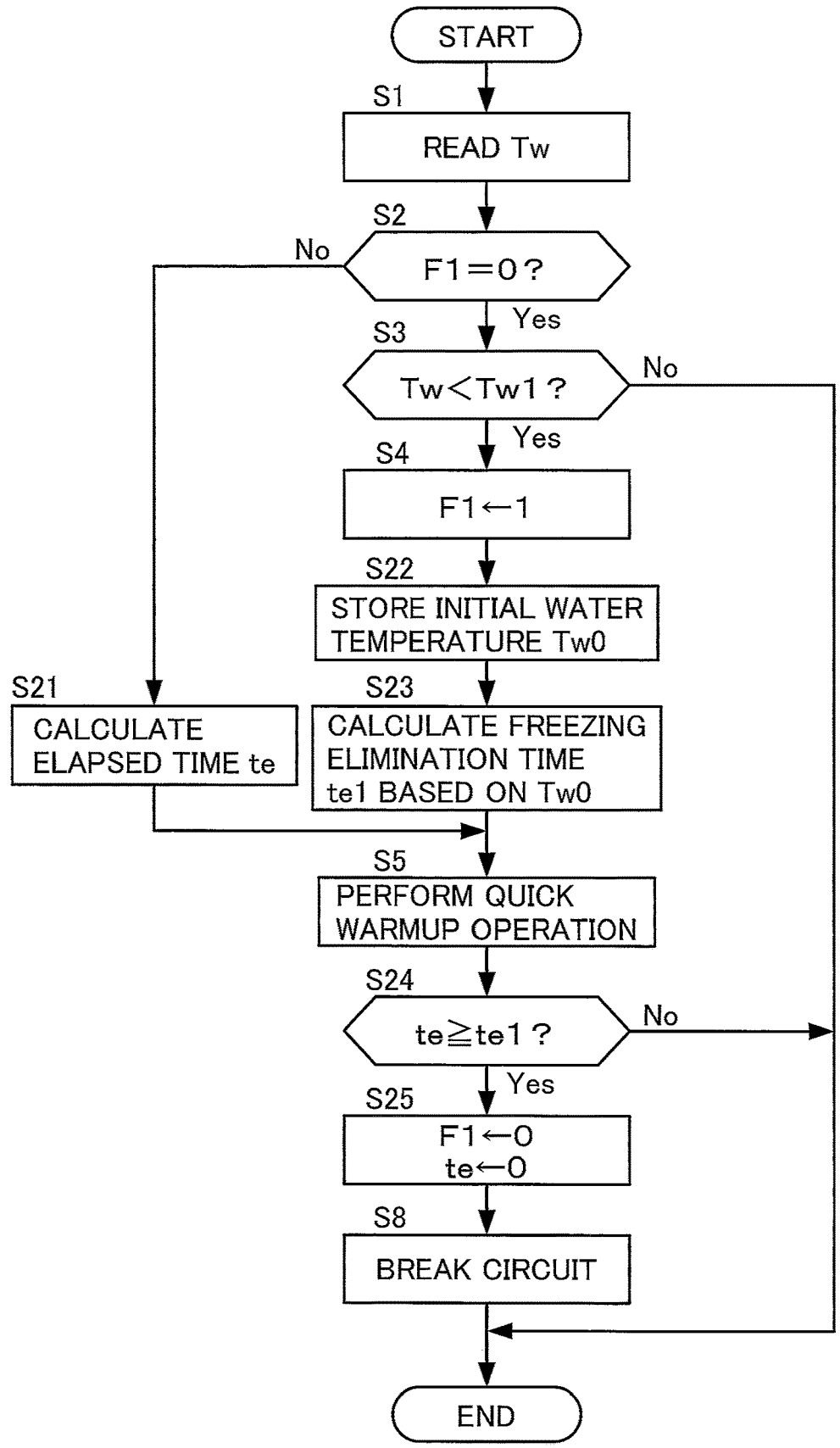
FIG. 4 is a flow chart for explaining voltage restoration control according to a second embodiment of the present disclosure.

FIG. 4 is a flow chart explaining the voltage recovery control according to the present embodiment. The electronic control unit 200 repeatedly performs this routine during operation of the fuel cell system 100 by a predetermined processing period Δt (ms). In FIG. 4, step S1 to step S5 and step S8 perform processing similar to the first embodiment, so explanations will be omitted here.

At step S21, the electronic control unit 200 calculates the elapsed time te from when the hydrogen deficiency was judged to have occurred. In the present embodiment, the electronic control unit 200 adds the processing period Δt of the present routine to the previous value of the elapsed time te to calculate the elapsed time te. The initial value of the elapsed time te is zero.

Note that in the present embodiment, in this way, the time from when the hydrogen deficiency was judged to have occurred is made the elapsed time te, but instead of this, it is also possible to make the time from when the fuel cell system 100 is started up or the time from when the fuel cell stack 10 starts generating power after startup of the fuel cell system 100 as the elapsed time te.

At step S22, the electronic control unit 200 stores the cooling water temperature Tw when judging the hydrogen deficiency to have occurred at step S3 as the initial water temperature Tw0.

Figure 5:
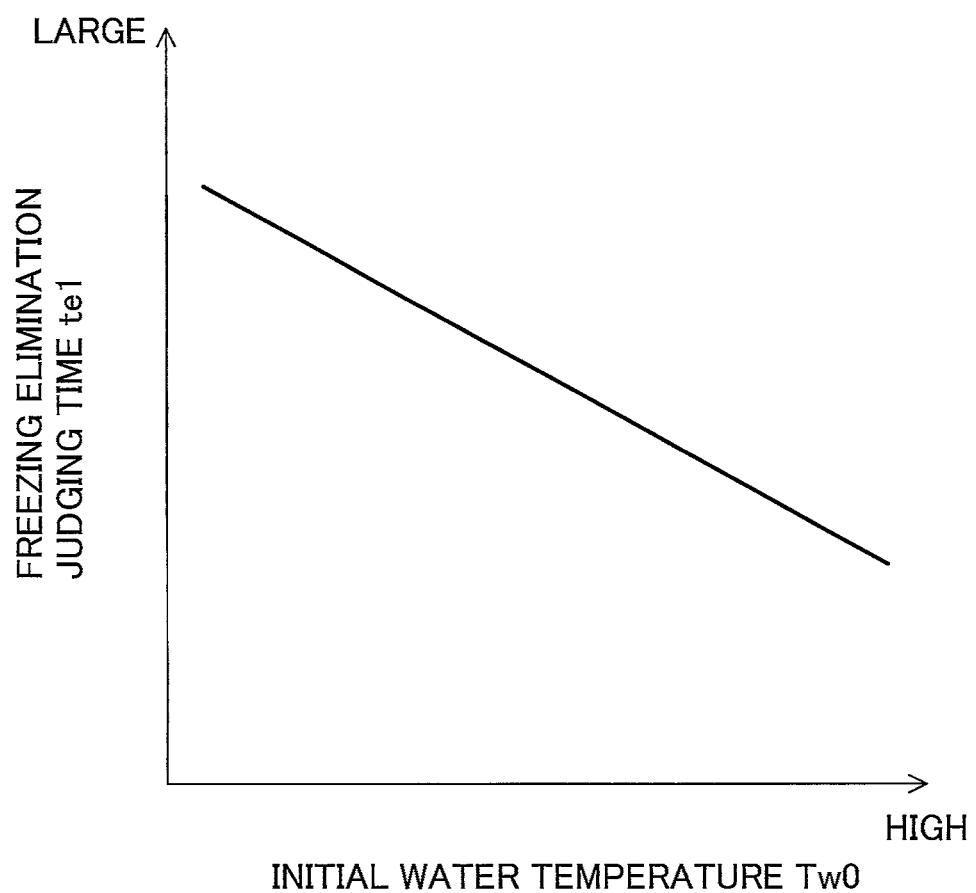
FIG. 5 is a table for calculating a freezing elimination judging time based on an initial water temperature.

At step S23, the electronic control unit 200 refers to a chart of FIG. 5 prepared in advance by experiments etc. and calculates the time until the hydrogen deficiency has been eliminated, that is, the time until the freezing of the residual water has been eliminated (below, referred to as the "freezing elimination judging time") te1 based on the initial water temperature Tw0. The chart of FIG. 5 is basically set so that the freezing elimination judging time te1 becomes longer when the initial water temperature Tw0 is low compared to when it is high. In the present embodiment, it is set so that the lower the initial water temperature Tw0, the longer the freezing elimination judging time te1.

At step S24, the electronic control unit 200 judges if the hydrogen deficiency has been eliminated. In the present embodiment, the electronic control unit 200 judges that the hydrogen deficiency has been eliminated if the elapsed time te is the freezing elimination judging time te1 or more. The electronic control unit 200 proceeds to the processing of step S7 if the elapsed time te is the freezing elimination judging time te1 or more. On the other hand, the electronic control unit 200 ends the current processing if the elapsed time te is less than the freezing elimination judging time te1.

At step S25, the electronic control unit 200 returns the flag F1 to "0" and returns the elapsed time te to the initial value of zero.

Figure 6:
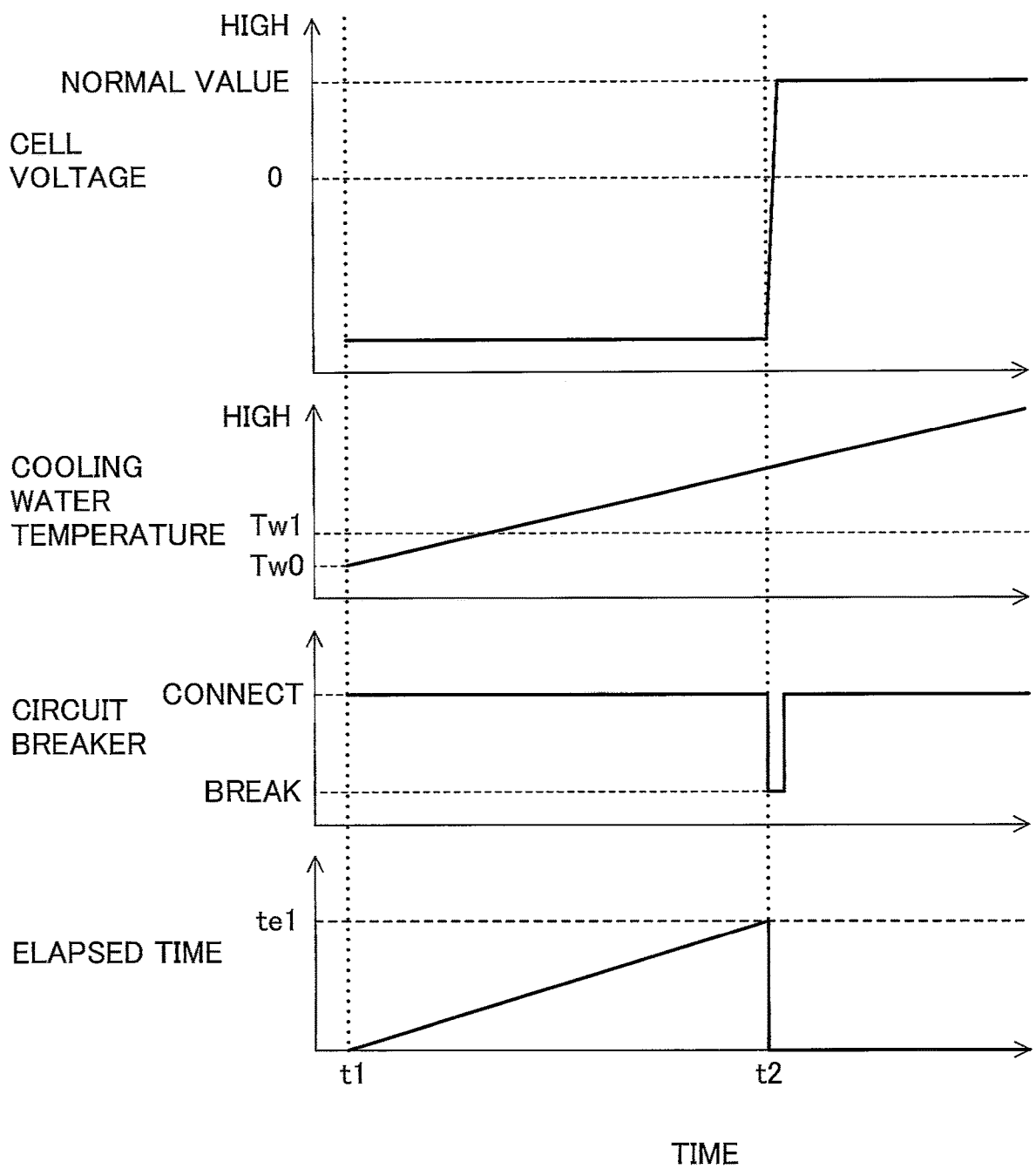
FIG. 6 is a time chart for explaining the operation of voltage restoration control according to the second embodiment of the present disclosure.

FIG. 6 is a time chart for explaining the operation of voltage recovery control according to the present embodiment.

At the time t1, the fuel cell system 100 is started up and the fuel cell system 100 starts to be operated. At this time, in the example shown in FIG. 6, the cooling water temperature Tw has become less than the freezing judging water temperature Tw1. Part of the unit cells 1 are hydrogen deficient. As a result, from the time t1 on during operation of the fuel cell system 100, the cell voltage becomes a negative voltage and an oxide film is formed on the surface of the platinum catalyst in the anode electrode of a unit cell 1 which has become hydrogen deficient. Further, in the present embodiment, at the time t1, the cooling water temperature Tw becomes less than the freezing judging water temperature Tw1, so the cooling water temperature Tw at the time t1 is stored as the initial water temperature Tw0 and the freezing elimination judging time te1 is set based on the initial water temperature Tw0.

At the time t2, if the elapsed time te becomes the freezing elimination judging time te1 or more, it is judged that the hydrogen deficiency has been eliminated, the circuit breaker 52 is opened for exactly a predetermined breaking time ts, and the electrical connection between the fuel cell stack 10 and the electrical load part 50 is physically broken. Due to this, while the cell voltage is a negative voltage, the oxide film formed on the surface of the platinum catalyst can be quickly reduced by the hydrogen, so the cell voltage can be speedily restored to the normal voltage value.

According to the present embodiment explained above, the freezing elimination judging part of the electronic control unit 200 is configured so as to judge that the hydrogen deficiency has been eliminated when the elapsed time te from when the hydrogen deficiency has been judged becomes a freezing elimination judging time te1 or more set based on the cooling water temperature when the hydrogen deficiency has been judged (that is, the initial water temperature Tw0). Further, the freezing elimination judging part is configured so as to lengthen the freezing elimination judging time te1 when the cooling water temperature when the hydrogen deficiency has been judged (that is, the initial water temperature Tw0) is low compared with when it is high.

Due to this, advantageous effects similar to the first embodiment are obtained. Also, elimination of the hydrogen deficiency occurring due to freezing of the residual water can be precisely judged based on the initial water temperature Tw0.

Third Embodiment

Next, a third embodiment of the present disclosure will be explained. The present embodiment differs from the first embodiment in the point of judging whether the hydrogen deficiency has been eliminated based on the internal impedance Z of the fuel cell stack 10 (HFR: High Frequency Resistance). Below, this point of difference will be focused on in the explanation.

Figure 7:
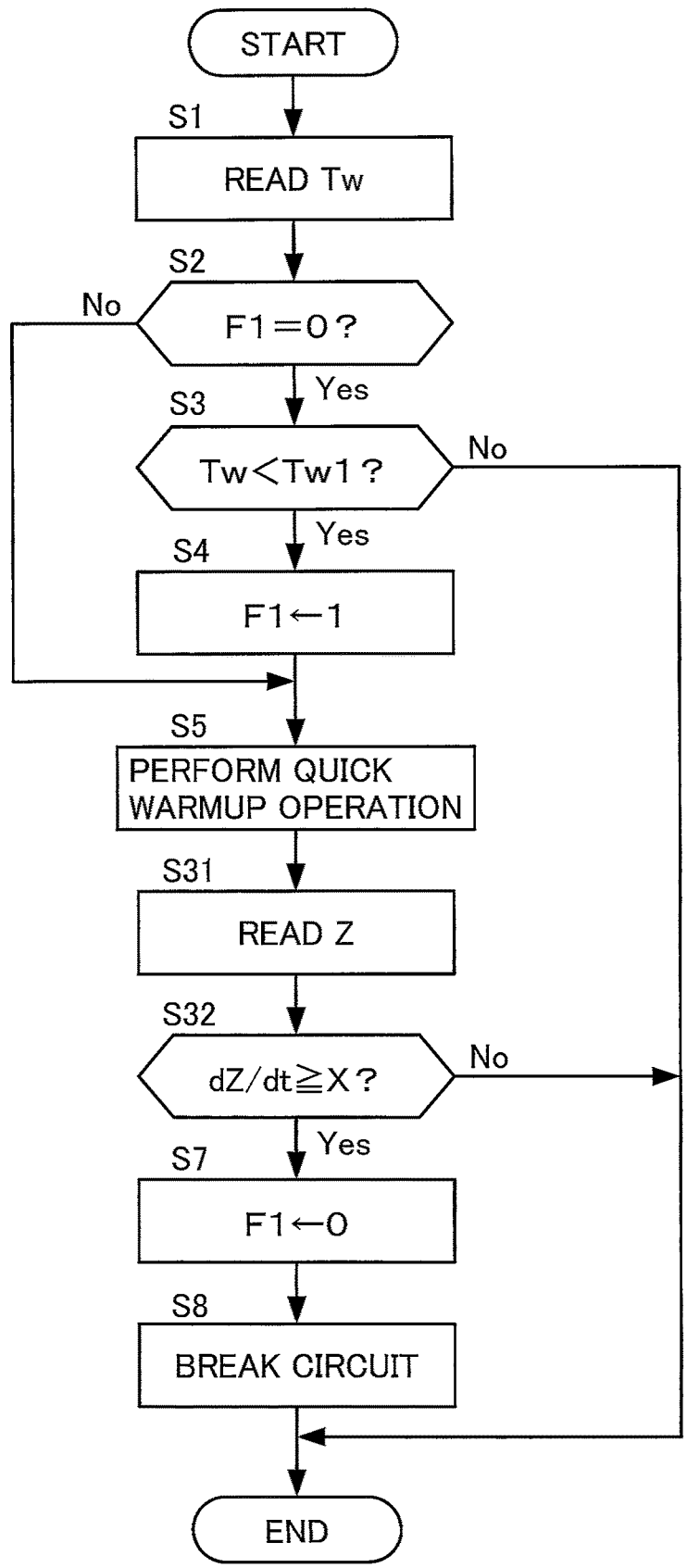
FIG. 7 is a flow chart for explaining voltage restoration control according to a third embodiment of the present disclosure.

FIG. 7 is a flow chart for explaining the voltage restoration control according to the present embodiment. The electronic control unit 200 repeatedly performs the present routine during operation of the fuel cell system 100 by a predetermined processing period Δt (ms). In FIG. 5, step S1 to step S5 and step S7 and step S8 perform processing similar to the first embodiment, so explanations will be omitted here.

At step S31, the electronic control unit 200 reads the internal impedance Z of the fuel cell stack 10 calculated at any time during operation of the fuel cell system 100 separate from the present routine. It is known that the internal impedance Z is correlated with the moisture degree of the electrolyte membrane. If the moisture degree of the electrolyte membrane becomes a constant moisture degree or less (that is, the amount of moisture in the electrolyte membrane becomes a constant level or less), the internal impedance Z tends to increase.

Note that the method of calculation of the internal impedance Z is not particularly limited. Various known methods (for example, the AC impedance method) may be used to calculate it. Further, in addition to this, it is possible to separately provide a device for measuring the internal impedance Z and actually measure the internal impedance Z. Note that the internal impedance Z is not limited to one calculated for the fuel cell stack 10 as a whole. It is also possible to configure the disclosure to calculate the internal impedances of the unit cells 1 in the fuel cell stack 10 and acquire the moisture degree of the electrolyte membrane based on at least one of the internal impedances of the unit cells 1. For example, when the location in a unit cell 1 of a fuel cell in which freezing will easily occur is known in advance, it is possible to calculate the internal impedance of the easily freezing unit cell 1 and acquire the moisture degree of the electrolyte membrane based on this.

At step S32, the electronic control unit 200 judges if the hydrogen deficiency has been eliminated. In the present embodiment, the electronic control unit 200 judges that the hydrogen deficiency has been eliminated if a differential value (dZ/dt) of the internal impedance Z is a predetermined value X or more. That is, the electronic control unit 200 judges that the hydrogen deficiency has been eliminated when the moisture degree of the electrolyte membrane becomes a constant level or less and the internal impedance Z starts to increase by a gradient of a certain constant gradient or more.

Below, the reason why it can be judged that the hydrogen deficiency has been eliminated if a differential value of an internal impedance (dZ/dt) is a predetermined value X or more will be explained.

As explained above, when operating the fuel cell system 100 in the situation where there is a unit cell 1 which has become hydrogen deficient, if a water electrolysis catalyst is contained in the anode electrode, at the anode electrode of the unit cell 1, the water inside the electrolyte membrane is utilized, the water electrolysis reaction shown in formula (4) becomes dominant, and hydrogen ions are produced. As a result, the cell voltage becomes a negative voltage and an oxide film is formed on the surface of the platinum catalyst in the anode electrode.

Once the platinum catalyst is covered by an oxide film, the platinum catalyst loses activity, so even after the hydrogen deficiency has been eliminated, the hydrogen oxidation reaction shown in formula (1) becomes hard to occur at the anode electrode and with just a hydrogen oxidation reaction, hydrogen ions can no longer be sufficiently generated. For this reason, a water electrolysis reaction occurs if making the anode electrode contain a water electrolysis catalyst to make up for the insufficient hydrogen ions even after the hydrogen deficiency has been eliminated.

That is, if the fuel cell system 100 is operated with a hydrogen deficiency and an oxide film is formed once on the surface of the platinum catalyst of the anode electrode, even after the hydrogen deficiency is eliminated, a water electrolysis reaction continues to occur at the anode electrode. In the water electrolysis reaction, the water in the electrolyte membrane is used, so if the water electrolysis reaction continues, the electrolyte membrane gradually dries. If the moisture degree of the electrolyte membrane becomes a constant level or less, the internal impedance Z which had been maintained at generally a certain constant value starts to increase by a gradient of a certain constant gradient or more.

At this time, for example, if freezing caused a hydrogen deficiency, the time until the hydrogen deficiency is eliminated, that is, the time until the freezing is eliminated, is sufficiently shorter than the time until the moisture degree of the electrolyte membrane becomes a constant level or less due to the water electrolysis reaction continuing to be performed after a hydrogen deficiency occurred, that is, the time until the internal impedance Z turns to an increase by a gradient of a certain constant gradient or more.

For this reason, if the differential value (dZ/dt) of the internal impedance Z becomes a predetermined value X or more after a hydrogen deficiency has been judged to have occurred, it can be judged that the hydrogen deficiency has been eliminated.

Figure 8:
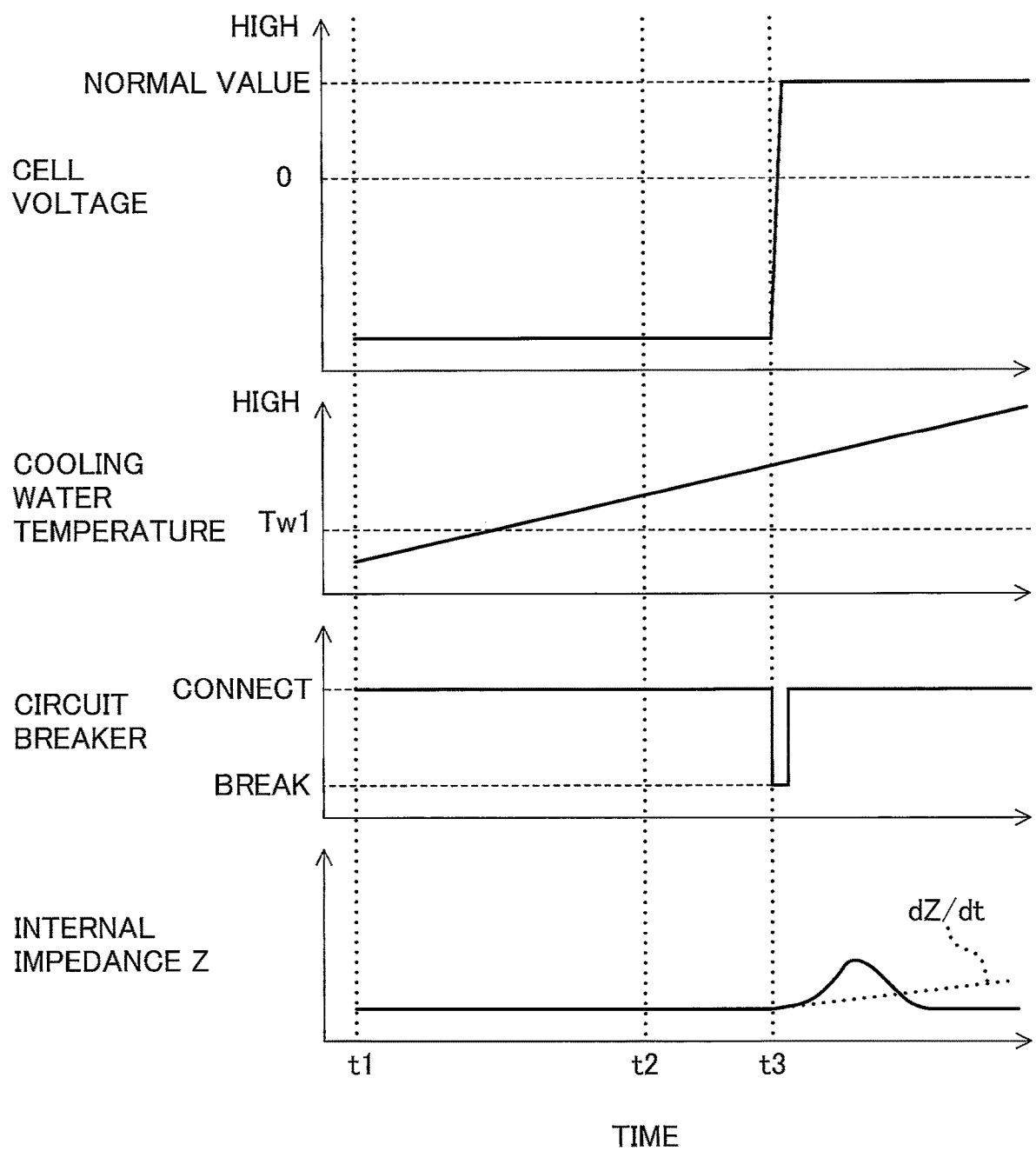
FIG. 8 is a time chart for explaining the operation of voltage restoration control according to the third embodiment of the present disclosure.

FIG. 8 is a time chart for explaining the operation of voltage restoration control according to the present embodiment.

At the time t1, the fuel cell system 100 is started up and the fuel cell system 100 starts to be operated. At this time, in the example shown in FIG. 8, the cooling water temperature Tw becomes less than the freezing judging water temperature Tw1 and part of the unit cells 1 become hydrogen deficient. As a result, during operation of the fuel cell system 100 from the time t1 on, the cell voltage becomes a negative voltage and an oxide film is formed on the surface of the platinum catalyst in the anode electrode of a unit cell 1 which has become hydrogen deficient.

At the time t2, if the hydrogen deficiency is eliminated along with the rise of the cooling water temperature Tw, the anode electrode is placed in a hydrogen atmosphere, but since an oxide film is formed on the surface of the platinum catalyst in the anode electrode, as explained above, a water electrolysis reaction occurs at the anode electrode. For this reason, at the time t2 on as well, the cell voltage remains a negative voltage as it is.

A water electrolysis reaction continues to occur at the anode electrode even after the hydrogen deficiency has been eliminated at the time t2, whereby at the time t2 on as well, the electrolyte membrane gradually dries out. As a result, if at the time t3 the moisture degree of the electrolyte membrane becomes a certain level or less, the internal impedance Z increases by a gradient of a certain constant gradient or more. In the present embodiment, it is judged that the hydrogen deficiency has been eliminated at this time, the circuit breaker 52 is opened for exactly a predetermined breaking time ts, and the electrical connection of the fuel cell stack 10 and electrical load part 50 is physically broken. Due to this, while the cell voltage is a negative voltage, it is possible to quickly reduce by hydrogen the oxide film formed at the surface of the platinum catalyst, so it is possible to quickly restore the cell voltage to the normal voltage value.

According to the present embodiment explained above, the freezing elimination judging part of the electronic control unit 200 is configured so as to judge that the hydrogen deficiency has been eliminated when the moisture degree of the electrolyte membrane of the fuel cell stack 10 has become a predetermined moisture degree or less. Specifically, the freezing elimination judging part is configured to judge that the moisture degree of the electrolyte membrane of the fuel cell stack 10 has become a predetermined moisture degree or less when the differential value of the internal impedance Z of the fuel cell stack 10 has become a predetermined value X or more.

Due to this, an advantageous effect similar to the first embodiment is obtained and elimination of the hydrogen deficiency occurring due to the freezing of the residual water can be judged based on the internal impedance Z of the fuel cell stack 10. Note that, the disclosure is not limited to the case of judging the moisture degree of the electrolyte membrane of the fuel cell stack 10 based on the differential value of the internal impedance Z as explained above. For example, it may also be configured so as to judge that the moisture degree of the electrolyte membrane of the fuel cell stack 10 has become a predetermined moisture degree or less when the value of the internal impedance Z has become a predetermined value X2 or more.

Fourth Embodiment

Next, a fourth embodiment of the present disclosure will be explained. The present embodiment differs from the above embodiments in the point of further judging if a unit cell 1 becoming hydrogen deficient due to flooding is liable to be present. Below, this point of difference will be focused on in the explanation.

In the above-mentioned first embodiment to third embodiment, if the cooling water temperature Tw is less than the freezing judging water temperature Tw1, it was judged that a unit cell 1 becoming hydrogen deficient due to freezing of the residual water was liable to be present.

However, in some cases supply of hydrogen to a unit cell 1 is blocked by factors other than such freezing of the residual water.

In the above-mentioned way, the electronic control unit 200 controls the cooling water pump 42 so that the cooling water temperature Tw becomes a predetermined target temperature (for example 60° C.). However, if power is continuously generated by a relatively low load after the fuel cell system 100 has started up etc., time is sometimes taken until the cooling water temperature Tw reaches the target temperature. If power is generated in this way in a state where the cooling water temperature Tw is lower than the target temperature, during power generation, the raw water passing from a cathode electrode side to an anode electrode side will not evaporate but will remain in a hydrogen channel 2a resulting in flooding in the hydrogen channel 2a in some cases. As a result, the supply of hydrogen to a unit cell 1 will sometimes be obstructed.

Therefore, in the present embodiment, further, if there was a unit cell 1 which became hydrogen deficient due to flooding, after the flooding is eliminated, the circuit breaker 52 is used to physically temporarily break the electrical connection of the fuel cell stack 10 and electrical load part 50. Below, this voltage restoration control according to the present embodiment will be explained.

Figure 9:
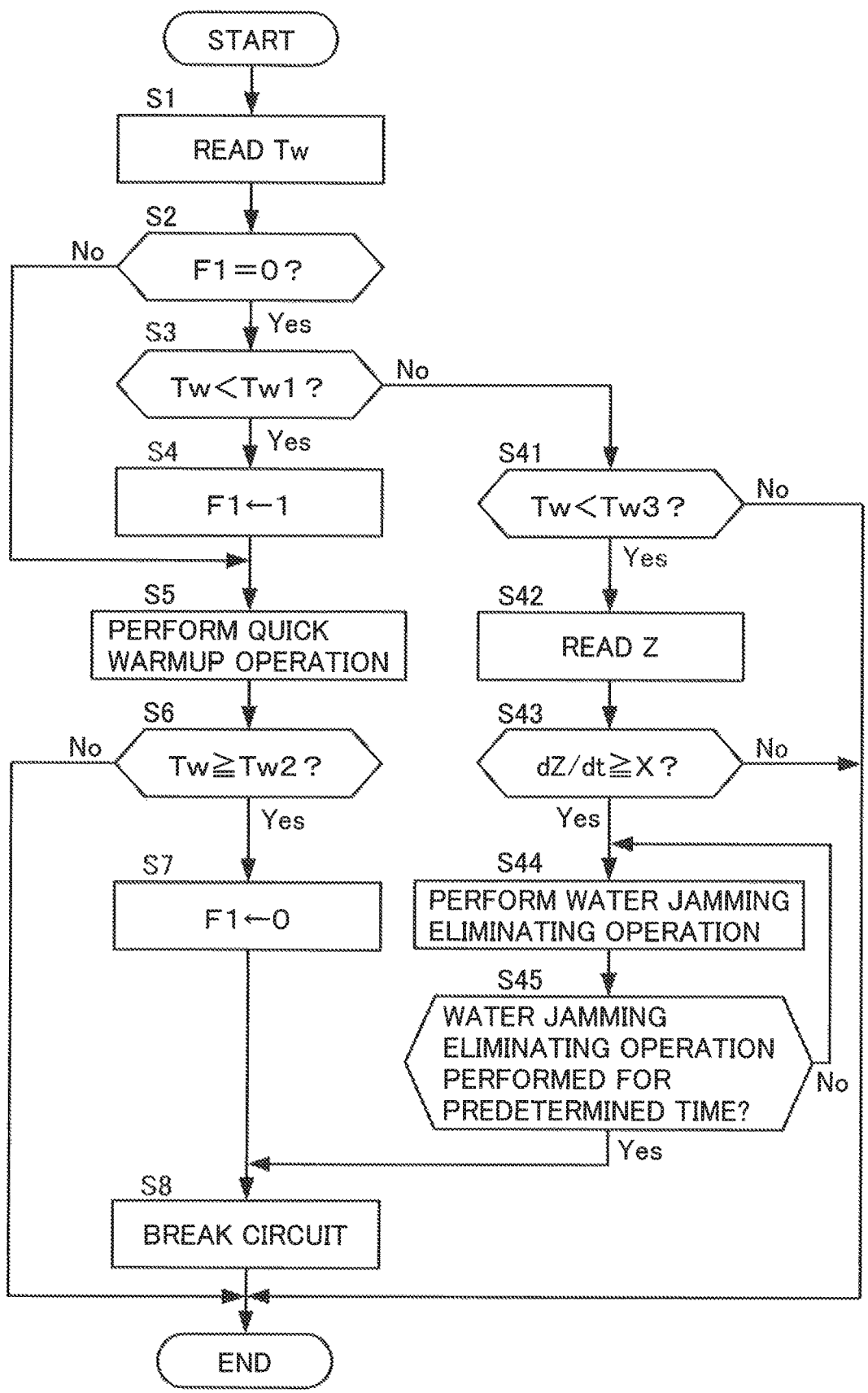
FIG. 9 is a flow chart for explaining voltage restoration control according to a fourth embodiment of the present disclosure.

FIG. 9 is a flow chart explaining voltage restoration control according to the present embodiment. The electronic control unit 200 repeatedly performs this routine during operation of the fuel cell system 100 by a predetermined processing period Δt (ms). In FIG. 9, step S1 to step S8 perform processing similar to the first embodiment, so explanations will be omitted here.

At step S41, the electronic control unit 200 judges if there is liable to be a unit cell 1 which has become hydrogen deficient due to flooding. In the present embodiment, the electronic control unit 200 judges that there is liable to be a unit cell 1 which has become hydrogen deficient due to flooding if the cooling water temperature Tw is less than a predetermined flooding judging water temperature Tw3 (for example 50° C.) and proceeds to the processing of step S42. On the other hand, the electronic control unit 200 ends the current processing if the cooling water temperature Tw is the flooding judging water temperature Tw3 or more.

At step S42, the electronic control unit 200 reads the internal impedance Z of the fuel cell stack 10 calculated at any time during operation of the fuel cell system 100 separately from the present routine.

At step S43, the electronic control unit 200 judges if the differential value (dZ/dt) of the internal impedance Z is a predetermined value X or more. The reason why it is judged if the differential value (dZ/dt) of the internal impedance Z has become a predetermined value X or more in a situation where, in this way, the cooling water temperature Tw is the freezing judging water temperature Tw1 or more and less than the flooding judging water temperature Tw3 is as follows.

If the cooling water temperature Tw is less than the flooding judging water temperature Tw3, the fuel cell stack 10 becomes lower in temperature than when usual, so the moisture degree of the electrolyte membrane basically becomes higher (that is, the membrane is not dry). Therefore, if the differential value (dZ/dt) of the internal impedance Z is the predetermined value X or more in a situation where the cooling water temperature Tw is the freezing judging water temperature Tw1 or more and less than the flooding judging water temperature Tw3, flooding causes at least part of the unit cells 1 to become hydrogen deficient, a water electrolysis reaction occurs continuously in the anode electrodes of those unit cells 1 resulting in the electrolyte membranes drying out, and it can be judged that the internal impedance Z has started to increase.

Therefore, if at step S43 the differential value (dZ/dt) of the internal impedance Z is a predetermined value X or more, the electronic control unit 200 proceeds to the processing of step S44 and step S45 where it performs a flooding elimination operation for exactly a predetermined time for making the hydrogen flow rate temporarily increase to eliminate flooding, then proceeds to the processing of step S8 where it opens the circuit breaker 52 for exactly a predetermined breaking time is and physically temporarily breaks the electrical connection of the fuel cell stack 10 and electrical load part 50 by the circuit breaker 52.

On the other hand, if at step S43 the differential value (dZ/dt) of the internal impedance Z is less than the predetermined value X, the electronic control unit 200 ends the current processing. Note that, if the cooling water temperature Tw is the freezing judging water temperature Tw1 or more and less than the flooding judging water temperature Tw3, flooding will not necessarily occur, so fundamentally if there is no unit cell 1 becoming hydrogen deficient due to flooding, basically the differential value (dZ/dt) of the internal impedance Z will not become a predetermined value X or more. Therefore, in such a case, the routine proceeds to NO at step S43.

At step S44, the electronic control unit 200 performs a flooding elimination operation eliminating flooding by temporarily making the hydrogen flow rate increase.

At step S45, the electronic control unit 200 judges if the flooding elimination operation has been performed for a predetermined time. That is, it judges if the hydrogen deficiency due to flooding has been eliminated. The electronic control unit 200 proceeds to the processing of step S8 if the flooding elimination operation has been performed for a predetermined time. On the other hand, the electronic control unit 200 continues the flooding elimination operation if the flooding elimination operation has not been performed for a predetermined time.

FIG. 10 is a time chart explaining the operation of voltage restoration control according to the present embodiment.

At the time t1, if flooding causes a hydrogen deficiency during operation of the fuel cell system 100, the cell voltage of the unit cell 1 in the hydrogen deficiency becomes a negative voltage. In the example shown in FIG. 10, at the time t1 on, the cooling water temperature Tw becomes less than the flooding judging water temperature Tw3, so it is continuously judged if the differential value (dZ/dt) of the internal impedance Z has become a predetermined value X or more.

From the time t1 to the time t2, at an anode electrode of a unit cell 1 becoming hydrogen deficient due to flooding, a water electrolysis reaction occurs and the electrolyte membrane dries out. As a result, at the time t1 on, the electrolyte membrane gradually dries out. If, at the time t2, the moisture degree of the electrolyte membrane becomes a constant level or less, the internal impedance Z increases by a gradient of a certain constant gradient or more. Due to this, at the time t2, power was generated continuously in a state where the cooling water temperature Tw was lower than the target temperature, so it is judged that flooding has caused a unit cell 1 which has become hydrogen deficient and the flooding elimination operation is performed for exactly a predetermined time to eliminate the flooding.

Further, at the time t3 after the flooding elimination operation has been performed for exactly a predetermined time, the circuit breaker 52 is opened for exactly a predetermined breaking time is and the electrical connection between the fuel cell stack 10 and the electrical load part 50 is physically broken. Due to this, while the cell voltage is a negative voltage, the oxide film formed on the surface of the platinum catalyst can be quickly reduced by the hydrogen, so the cell voltage can be speedily restored to a normal voltage value.

According to the present embodiment explained above, the hydrogen deficiency judging part of the electronic control unit 200 is configured to provide with a first judging part judging that freezing of water has caused a hydrogen deficiency when a cooling water temperature Tw representing the temperature of the fuel cell (representative temperature) is less than a predetermined freezing judging temperature Tw1 where freezing of water inside the fuel cell is liable to occur and a second judging part judging that flooding of water has caused a hydrogen deficiency when the differential value of the internal impedance Z of a fuel cell has become a predetermined value X or more in the case where the cooling water temperature Tw is the freezing judging temperature Tw1 or more and less than a predetermined flooding judging temperature Tw3 where flooding is liable to occur in the hydrogen channel 2a in the fuel cell. Further, the freezing elimination judging part is configured to judge that the hydrogen deficiency has been eliminated when performing a flooding elimination operation for a predetermined time for temporarily increasing the amount of hydrogen supplied to the fuel cell so as to eliminate the flooding when it is judged that flooding has caused a hydrogen deficiency.

Due to this, an effect similar to the first embodiment occurs. Also, in addition to the hydrogen deficiency occurring due to the freezing of the residual water, it is possible to judge the occurrence and elimination of a hydrogen deficiency occurring due to flooding. For this reason, even if flooding causes a hydrogen deficiency and the voltage falls, it is possible to quickly return the voltage of a unit cell 1 which has become hydrogen deficient to a normal voltage value after the elimination of the hydrogen deficiency due to flooding.

Above, embodiments of the present disclosure were explained, but the embodiments only show parts of the examples of application of the present disclosure and are not meant to limit the technical scope of the present disclosure to the specific constitutions of the embodiments.

The invention claimed is:

1. A control device for a fuel cell system for controlling the fuel cell system,
the fuel cell system comprising:
a fuel cell with a cathode electrode and an anode electrode containing a water electrolysis catalyst;
an electrical load part electrically connected to the fuel cell; and
a circuit breaker configured to physically break both an electrical connection between the cathode electrode side of the fuel cell and the electrical load part and an electrical connection between the anode electrode side of the fuel cell and the electrical load part, wherein
the control device for a fuel cell system comprising a microprocessor, the microprocessor programmed to:
judge if a hydrogen deficiency which is a state in which an amount of hydrogen supplied to the fuel cell is insufficient compared with an amount of hydrogen required for power generation has occurred;
judge if the hydrogen deficiency has been eliminated after judging that the hydrogen deficiency has occurred;
open the circuit breaker to physically temporarily break both the electrical connection between the cathode electrode side of the fuel cell and the electrical load part and the electrical connection between the anode electrode side of the fuel cell and the electrical load part for a predetermined breaking time when the hydrogen deficiency has been eliminated; and
during the predetermined breaking time, stop a hydrogen oxidation reaction at the anode electrode, place the anode electrode in a hydrogen atmosphere, and reduce by hydrogen an oxide film formed on a surface of a hydrogen oxidation reaction promotion catalyst in the anode electrode.

2. The control device for a fuel cell system according to claim 1, wherein
the microprocessor is programmed to judge the hydrogen deficiency has occurred when a representative temperature of the fuel cell is less than a predetermined freezing judging temperature where water inside the fuel cell is liable to freeze.

3. The control device for a fuel cell system according to claim 2, wherein
the microprocessor is programmed to judge that the hydrogen deficiency has been eliminated when the representative temperature becomes a predetermined freezing elimination judgment temperature higher than the freezing judging temperature or has become more than the predetermined freezing elimination judgment temperature.

4. The control device for a fuel cell system according to claim 2, wherein
the microprocessor is programmed to judge that the hydrogen deficiency has been eliminated when an elapsed time from when the hydrogen deficiency was judged has become a freezing elimination judging time or more set based on the representative temperature when the hydrogen deficiency was judged.

5. The control device for a fuel cell system according to claim 4, wherein
the microprocessor is programmed to lengthen the freezing elimination judging time when the representative temperature when the hydrogen deficiency was judged is low compared to when it is high.

6. The control device for a fuel cell system according to claim 2, wherein
the microprocessor is programmed to judge that the hydrogen deficiency has been eliminated when a moisture degree of an electrolyte membrane of the fuel cell has become a predetermined moisture degree or less.

7. The control device for a fuel cell system according to claim 6, wherein
the microprocessor is programmed to judge that the moisture degree of the electrolyte membrane of the fuel cell has become the predetermined moisture degree or less when a differential value of an internal impedance of the fuel cell has become a predetermined value or more.

8. The control device for a fuel cell system according to claim 1, wherein
the microprocessor is programmed:
judge that the hydrogen deficiency has occurred due to freezing of water when a representative temperature of the fuel cell is less than a predetermined freezing judging temperature where freezing of water is liable to occur inside the fuel cell;
judge that the hydrogen deficiency has occurred due to flooding of water when a differential value of an internal impedance of the fuel cell becomes a predetermined value or more, in a case where the representative temperature is the freezing judging temperature or more and the representative temperature is less than a predetermined flooding judging temperature where flooding is liable to occur in a hydrogen channel in the fuel cell; and
judge that the hydrogen deficiency has been eliminated when performing a flooding elimination operation for a predetermined time for temporarily increasing the amount of hydrogen supplied to the fuel cell to eliminate flooding when it has been judged that the hydrogen deficiency has occurred due to flooding.

9. The control device for a fuel cell system according to claim 1, wherein
the predetermined breaking time during which the circuit breaker physically temporarily breaks both the electrical connection between the cathode electrode side of the fuel cell and the electrical load part and the electrical connection between the anode electrode side of the fuel cell and the electrical load part is 1 millisecond to 30 minutes.

10. The control device for a fuel cell system according to claim 9, wherein
the predetermined breaking time is 1 millisecond to 1 minute.

11. The control device for a fuel cell system according to claim 10, wherein
the predetermined breaking time is 1 millisecond to 3 seconds.

* * * * *